(12) United States Patent
Fukuman et al.

(10) Patent No.: US 11,465,615 B2
(45) Date of Patent: Oct. 11, 2022

(54) VEHICLE CONTROL APPARATUS AND VEHICLE CONTROL METHOD

(71) Applicants: DENSO CORPORATION, Kariya (JP); TOYOTA JIDOSHA KABUSHIKI KAISHA, Toyota (JP)

(72) Inventors: Masumi Fukuman, Kariya (JP); Akihiro Kida, Toyota (JP)

(73) Assignees: DENSO CORPORATION, Kariya (JP); TOYOTA JIDOSHA KABUSHIKI KAISHA, Toyota (JP)

(*) Notice: Subject to any disclaimer, the term of this patent is extended or adjusted under 35 U.S.C. 154(b) by 271 days.

(21) Appl. No.: 15/740,551

(22) PCT Filed: Jun. 21, 2016

(86) PCT No.: PCT/JP2016/068375
§ 371 (c)(1),
(2) Date: Dec. 28, 2017

(87) PCT Pub. No.: WO2017/002668
PCT Pub. Date: Jan. 5, 2017

(65) Prior Publication Data
US 2018/0201259 A1    Jul. 19, 2018

(30) Foreign Application Priority Data
Jun. 30, 2015 (JP) .............................. JP2015-131129

(51) Int. Cl.
*B60W 30/09* (2012.01)
*B60W 30/095* (2012.01)
*B60W 30/18* (2012.01)

(52) U.S. Cl.
CPC ........ *B60W 30/09* (2013.01); *B60W 30/0956* (2013.01); *B60W 30/18036* (2013.01); *B60W 30/18109* (2013.01); *B60W 2520/06* (2013.01); *B60W 2554/00* (2020.02)

(58) Field of Classification Search
CPC .............................................. B60Y 2300/1805
See application file for complete search history.

(56) References Cited

U.S. PATENT DOCUMENTS

| | | | |
|---|---|---|---|
| 2007/0150158 A1* | 6/2007 | Inoue | B60W 30/18027 701/67 |
| 2016/0114800 A1* | 4/2016 | Shimizu | B60W 30/0956 701/70 |
| 2017/0349170 A1 | 12/2017 | Sawada et al. | |

FOREIGN PATENT DOCUMENTS

JP    2014-091351 A    5/2014

* cited by examiner

*Primary Examiner* — Lail A Kleinman
(74) *Attorney, Agent, or Firm* — Maschoff Brennan

(57) ABSTRACT

A vehicle control apparatus is mounted in a vehicle and includes: an object detecting unit that detects an object in a travelling direction of the vehicle; and a suppressing unit that suppresses driving force of the vehicle when the object detecting unit detects the object. The suppressing unit performs a first process to gradually increase the driving force when a command to move in the travelling direction is issued and the vehicle is stopped in a state in which the driving force of the vehicle is suppressed, and after the vehicle starts to move from the stopped state, performs a second process to gradually increase the driving force with an amount of increase per time in the driving force that is less than that in the first process.

13 Claims, 7 Drawing Sheets

FIG.2
(a)
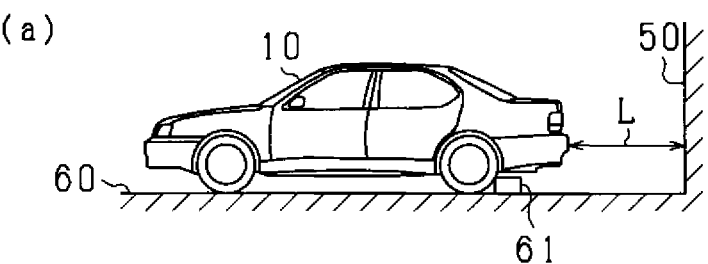
(b)
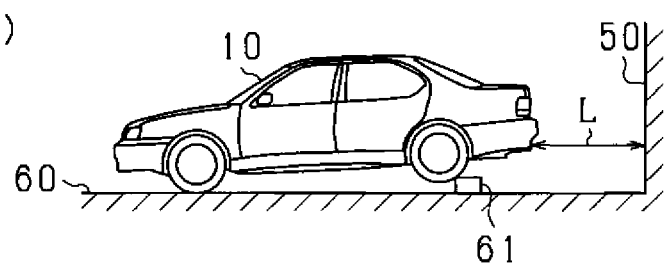
(c)
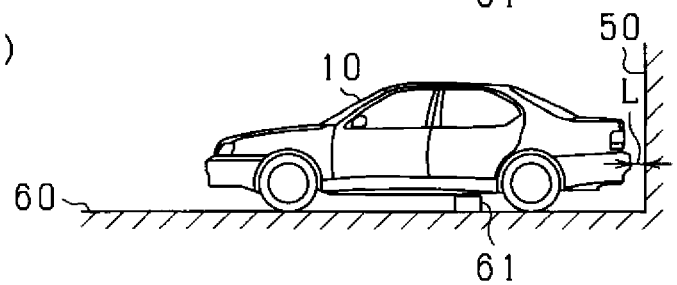

VEHICLE CONTROL APPARATUS AND VEHICLE CONTROL METHOD

CROSS-REFERENCE TO RELATED APPLICATIONS

The present application is based on and claims the benefit of priority from Japanese Patent Application No. 2015-131129, filed on Jun. 30, 2015, the descriptions of which are incorporated herein by reference.

TECHNICAL FIELD

The present disclosure relates to a vehicle control apparatus that detects an object present in a travelling direction of a vehicle and controls the vehicle, and a vehicle control method performed by the vehicle control apparatus.

BACKGROUND ART

Conventionally, a vehicle control apparatus in which a distance measurement sensor, such as an ultrasonic wave sensor, is mounted in a vehicle and the vehicle control apparatus detects an object, such as a leading vehicle, a pedestrian, or a structure on a road, present in the periphery of the vehicle as an obstacle using the distance measurement sensor is proposed. The vehicle control apparatus performs various types of control to improve traveling safety of the vehicle, such as operation of a braking apparatus and notification to a driver, based on an object detection result from the distance measurement sensor.

In the vehicle control apparatus, when an obstacle is detected in the travelling direction of the vehicle, control to restrict driving force in the travelling direction is performed. At this time, when a bump or the like is present between the vehicle and the obstacle, the driving force may not be sufficient for the vehicle to traverse the bump, regardless of the vehicle being able to approach the obstacle. Consequently, the vehicle cannot traverse the bump and sufficiently approach the obstacle.

In this regard, as an apparatus that enables a bump to be traversed when the bump is present between a vehicle and an obstacle, there is a driving assistance apparatus described in PTL 1. In the driving assistance apparatus described in PTL 1, when the obstacle is present in the travelling direction of the vehicle, the driving force of the vehicle is restricted. When a bump is present between the vehicle and the obstacle, control is performed to gradually increase the restricted driving force to enable the vehicle to traverse the bump. Then, when a vehicle speed exceeds a threshold, the driving force that has been increased is returned to an initial value.

CITATION LIST

Patent Literature

[PTL 1] JP-A-2014-91351

SUMMARY OF INVENTION

Technical Problem

In the driving assistance apparatus described in PTL 1, the control to increase the driving force is performed until the vehicle speed exceeds the threshold, even after the vehicle has started to move to traverse the bump. Therefore, the increase in the driving force becomes excessive. Consequently, the speed when the vehicle traverses the bump becomes excessive.

The main object of the present disclosure is to provide a vehicle control apparatus that is capable of more accurately starting a vehicle in a state in which driving force is suppressed, and a vehicle control method performed by the vehicle control apparatus.

Solution to Problem

A first aspect of the present disclosure is a vehicle control apparatus and includes: an object detecting unit that detects an object in a travelling direction of the vehicle; and a suppressing unit that suppresses driving force of the vehicle when the object detecting unit detects the object. The suppressing unit performs a first process to gradually increase the driving force from an initial value when a command to move in the travelling direction is issued and the vehicle is stopped in a state in which the driving force of the vehicle is suppressed, and after the vehicle starts to move from the stopped state, performs a second process to gradually increase the driving force with an amount of increase per time in the driving force that is less than that in the first process.

When an object that is present in the travelling direction of the vehicle is detected and the driving force of the vehicle is suppressed based on a distance to the object or the like, in cases in which a bump or the like is present between the vehicle and the object, the bump may not be able to be traversed. In a similar manner, when a road surface is sloped, the vehicle may not be able to be started. At this time, a speed of the vehicle in the travelling direction can be detected, and whether or not the vehicle is stopped as a result of the bump or the slope of the road surface can be determined based on the speed. However, when a command is issued to travel the vehicle is commanded, a divergence occurs between the command and the operation of the vehicle. Therefore, control to increase the driving force of the vehicle and start the vehicle is required.

In this control, the vehicle can be started as a result of the driving force being gradually increased from an initial value. However, if the gradual increase in the driving force is continued even after the vehicle starts to move, the vehicle speed may become excessive. Meanwhile, when the gradual increase in the driving force is immediately stopped when the vehicle starts to move, time is required for traversal of the bump and the like.

In this regard, in the above-described configuration, as a result of the amount of increase per time in the driving force being reduced when the vehicle starts to move, traversal of the bump and the like can be made possible while suppressing the vehicle speed from becoming excessive. In addition, when the vehicle starts to move, gradual increase in the driving force is performed rather than the gradual increase in the driving force being immediately ended or the driving force being returned to the initial value. Therefore, the amount of time required for traversal of the bump and the like can be shortened.

According to a second aspect of the disclosure, the aspect is a vehicle control apparatus and includes: an object detecting unit that detects an object in a travelling direction of a vehicle; a suppressing unit that suppresses driving force of the vehicle when the object detecting unit detects the object; and a state acquiring unit that acquires at least one of a value of speed of the vehicle in the travelling direction, a value of acceleration of the vehicle in the travelling direction, and a value of jerk in the travelling direction, as a determination value. The suppressing unit performs an increase process to gradually increase the driving force when the determination value is less than a threshold when a command to move in the travelling direction is issued in a state in which the driving force of the vehicle is suppressed. An amount of increase per time in the driving force is reduced as the determination value increases, in the increase process.

In this configuration, as a result of the amount of increase per time in the driving force being reduced as the determination value increases, traversal of the bump and the like can be made possible while suppressing the vehicle speed from becoming excessive. In addition, when the vehicle starts to move, gradual increase in the driving force is performed rather than the gradual increase in the driving force being immediately ended or the driving force being returned to the initial value. Therefore, the amount of time required for traversal of the bump and the like can be shortened.

BRIEF DESCRIPTION OF DRAWINGS

The above-described object, other objects, characteristics, and advantages of the present disclosure will be clarified through the detailed description herebelow, with reference to the accompanying drawings. In the drawings:

FIG. 2 is a diagram showing a state in which a vehicle traverses a bump and approaches a wall;

DESCRIPTION OF EMBODIMENTS

First Embodiment

A first embodiment actualized as a vehicle control apparatus that is mounted in a vehicle will hereinafter be described with reference to the drawings. The vehicle control apparatus according to the present embodiment receives detection information of an object from a distance measurement sensor. The vehicle control apparatus thereby detects another vehicle, a road structure, or the like as an object present in the periphery of the vehicle. First, an overall configuration of the vehicle control apparatus according to the present embodiment will be described with reference to FIG. 1.

Figure 1:
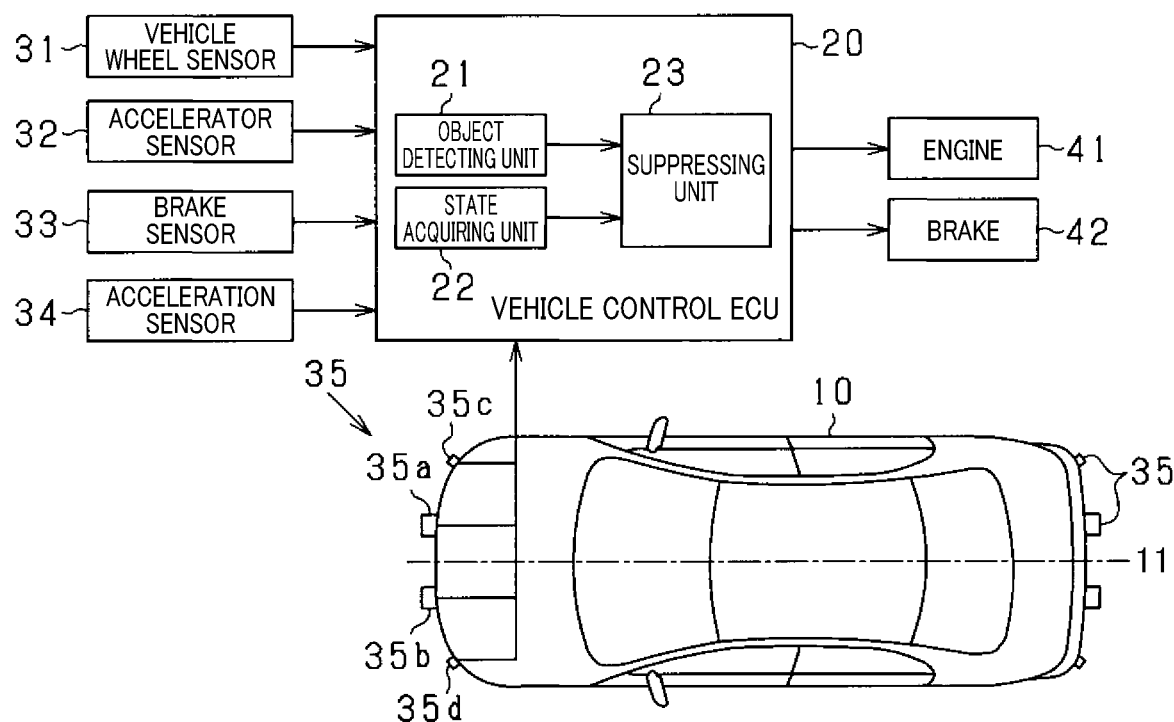
FIG. 1 is a schematic diagram of a vehicle control apparatus.

In FIG. 1, a vehicle 10 includes a vehicle control electronic control unit (ECU) 20 that is the vehicle control apparatus. The vehicle 10 includes a wheel speed sensor 31, an accelerator sensor 32, a brake sensor 33, an acceleration sensor 34, and a distance measurement sensor 35 as sensors. The sensors 31 to 35 are connected to the vehicle control ECU 20. The vehicle control ECU 20 receives signals from the sensors 31 to 35, and transmits control signals to at least either of an engine 41 and a brake 42. As a result, inter-vehicle distance control is performed.

A microcomputer, an interface for a wire harness, and the like are mounted in the vehicle control ECU 20. The microcomputer has a publicly known configuration that includes a central processing unit (CPU), a read-only memory (ROM), a random access memory (RAM), an input/output (I/O) interface, a controller area network (CAN) communication apparatus, and the like.

The wheel sensor 31 is a pulse detection type that outputs pulse signals at a predetermined cycle. According to the present embodiment, an electromagnetic pickup type that outputs the pulse signals at the predetermined cycle based on passage of a plurality of protruding portions provided on a rotor that rotates with a wheel is used. The vehicle control ECU 20 receives detection signals from the wheel speed sensor 31 and calculates a vehicle speed based on a pulse interval of the inputted detection signals.

The accelerator sensor 32 is a sensor that detects a depression amount of an accelerator pedal. The vehicle control ECU 20 receives a detection signal from the accelerator sensor 32 and determines required torque (required amount of air). The vehicle control ECU 20 then transmits a control signal to the engine 41 based on the required torque. As a result, driving force of the engine 41 is controlled. The brake sensor 33 is a sensor that detects a depression amount of a brake pedal. The vehicle control ECU 20 receives a detection signal from the brake sensor 33 and transmits a control signal to the brake 42.

The acceleration sensor 34 detects acceleration of the vehicle 10 based on force applied to the sensor itself. For example, a capacitance type or a piezoresistive type is used. In the acceleration sensor 34, acceleration in a state in which the vehicle 10 is stopped on a flat road surface and gravitational acceleration vertically acts on the vehicle 10 serves as reference. That is, in a state in which the vehicle 10 is stopped on a sloped road surface with a slope direction in a vehicle travelling direction, acceleration in the travelling direction of the vehicle 10 based on the slope is detected. The acceleration detected by the acceleration sensor 34 is inputted to the vehicle control ECU 20.

For example, the distance measurement sensor 35 is an ultrasonic wave sensor. The distance measurement sensor 35 provides a function for transmitting ultrasonic waves at 20 kHz to 100 kHz as probing wave and a function for receiving probing waves reflected by an object as reflected waves. According to the present embodiment, four distance measurement sensors 35 are attached to a vehicle front portion (such as a front bumper) with predetermined space therebetween, such as to be arrayed in a direction (vehicle width direction) perpendicular to the travelling direction of the vehicle 10. Specifically, the distance measurement sensors 35 include two center sensors (first sensor 35a and second sensor 35b) that are attached near a center line 11 of the vehicle 10, in symmetrical positions with respect to the center line 11, and corner sensors 35c and 35d that are respectively attached to a left corner and a right corner of the vehicle 10. In the vehicle 10, the distance measurement sensors 35 are also attached to a vehicle rear portion (such as a rear bumper). However, because the attachment positions and functions of the sensors are identical to those of the distance measurement sensors 35 in the vehicle front portion, descriptions thereof are omitted herein.

An object detecting unit 21 that is provided in the vehicle control ECU 20 detects whether or not an object in the periphery of the vehicle 10 is present based on the detection information of an object received from the distance measurement sensor 35. Specifically, the vehicle control ECU 20 transmits a control signal to the distance measurement sensor 35 and commands the distance measurement sensor 35 to transmit the probing wave at each transmission opportunity at a predetermined time interval (such as an interval of several hundred milliseconds).

Next, upon receiving the detection information of an object from the distance measurement sensor 35, the object detecting unit 21 determines whether or not an object in the periphery of the vehicle 10 is present based on the received detection information. Then, when an object is determined to be present in the travelling direction of the vehicle 10, deceleration control is performed by the engine 41 and the brake 42 being controlled, or notification by a warning sound is issued to the driver of the vehicle 10, so that the vehicle 10 does not come into contact with the object. In these controls, a state related to the vehicle 10 acquired from the sensors 31 to 34 by a state acquiring unit 22 is also used. Specifically, a suppressing unit 23 that is provided in the vehicle control ECU 20 performs control to suppress the driving force (torque) of the engine 41 to a value that is less than a required torque from the driver acquired by the accelerator sensor 32. When a distance between the vehicle 10 and the object decreases, the vehicle control ECU 20 performs control to operate the brake 42. In addition, when an amount of operation of the brake 42 by the driver acquired by the brake sensor 33 is insufficient for stopping the vehicle 10, control to operate the brake 42 is performed such that a braking force that is greater than the braking force instructed by the driver is exerted.

According to the present embodiment, when the vehicle 10 is traveling at a low speed, the distance measurement sensor 35 detects an obstacle, such as another vehicle, a wall, or a column, present at a distance that is relatively near the vehicle 10 (such as within 5 m), and collision avoidance regarding the obstacle is performed. For example, the function is provided when the vehicle 10 is parked.

FIG. 2 shows a state in which, when the vehicle 10 approaches a wall 50 by traveling in reverse, the vehicle 10 traverses a bump 61 on a road surface 60. The vehicle 10 is moved closer to the wall 50 and parked.

A distance L between the vehicle 10 and the wall 50 is measured by the distance measurement sensor 35. When the distance L decreases as a result of the vehicle 10 traveling in reverse, and the distance L falls below a drive suppression distance that is a predetermined distance, control to suppress the driving force of the vehicle 10 is performed. At this time, when the vehicle 10 is to traverse the bump 61 in the state in which the driving force is suppressed, the driving force becomes insufficient for traversing the bump 61. As shown in FIG. 2 by (a), the vehicle 10 stops before the bump 61 against the intention of the driver.

Here, when the driving force is increased, as shown in FIG. 2 by (b), the vehicle 10 can traverse the bump 61. As a result, the vehicle 10 can be moved closer to the wall 50. Then, as shown in FIG. 2 by (c), when the distance L between the vehicle 10 and the wall 50 further decreases and becomes a stop distance that is less than the drive suppression distance, the driving force is further suppressed. In addition, the brake 42 is applied, and the vehicle 10 is stopped.

At this time, when the driving force is continuously gradually increased in the state in which the vehicle 10 is starting to traverse the bump 61, the vehicle speed at the time traversal of the bump 61 is completed may become excessive. Therefore, when control to prevent a collision with the wall 50 is performed, a greater braking force may be required to be applied to the vehicle 10 or a situation in which contact with the wall 50 is unavoidable may occur.

Meanwhile, when the increase in the driving force is stopped or the driving force is returned to the initial driving force at the time the vehicle 10 is starting to traverse the bump 61, the vehicle 10 may stop in the midst of traversing the bump 61 or too much time may be required for the vehicle 10 to traverse the bump 61.

Therefore, according to the present embodiment, when a detection that the vehicle 10 has started to traverse the bump 61 is made, a process in which the driving force is gradually increased while suppressing an amount of increase per time in the driving force is continued. That is, the amount of increase per time in the driving force is large until the vehicle 10 starts to move. When the vehicle 10 starts to move, the amount of increase per time in the driving force is made relatively small. As a result, the driving force when the vehicle 10 traverses the bump 61 can be kept from becoming excessive while shortening the amount of time required for the vehicle 10 to traverse the bump 61.

At this time, jerk is used as a determination value for determining whether or not the vehicle 10 has started to move. The jerk can be obtained by differentiation of the acceleration of the vehicle 10 detected by the acceleration sensor 34. The amount of increase per time in the driving force is large until the value of the jerk exceeds a first predetermined value. When the value of the jerk exceeds the first predetermined value, the amount of increase per time in the driving force is relatively small. Then, when the value of the jerk exceeds a second predetermined value that is greater than the first predetermined value, a process to return the driving force to an initial driving force is performed because the vehicle 10 can be considered to have traversed the bump. The second predetermined value is used to end the process for increasing the driving force and therefore can also be considered a threshold.

Figure 3:
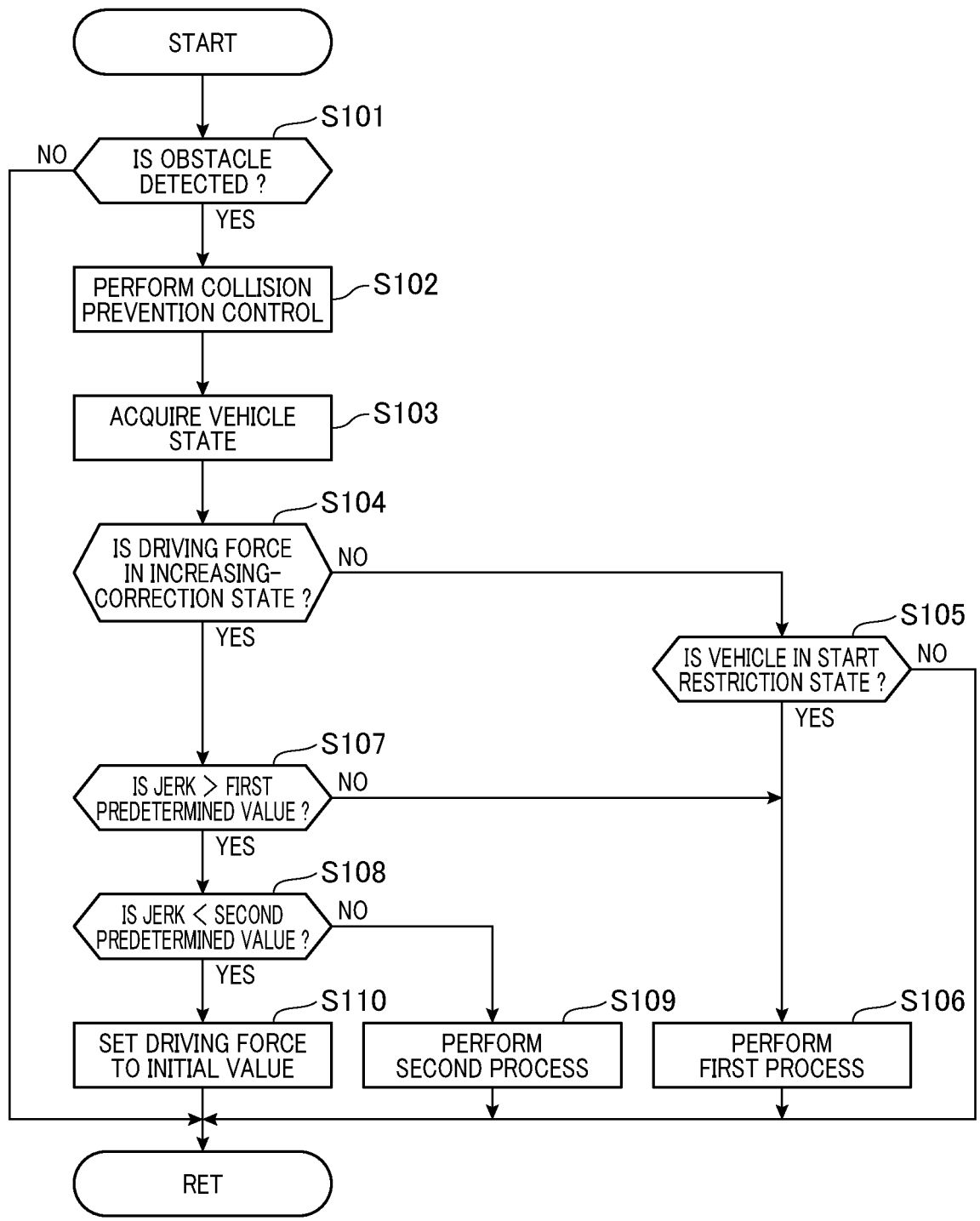
FIG. 3 is a flowchart showing processes according to a first embodiment.

FIG. 3 is a flowchart showing a series of processes according to the present embodiment. The series of processes shown in FIG. 3 is repeatedly performed at every predetermined control cycle.

First, whether or not an obstacle is detected within a predetermined distance in the travelling direction of the vehicle 10 is determined (S101). When an obstacle is not detected (NO at S101), the driving force is not required to be restricted. A required driving force f0 that is the driving force based on the accelerator operation by the driver is generated. Therefore, when the bump 61 is present, the bump 61 can be traversed by an accelerator operation based on the intention of the driver. Thus, the series of processes is ended.

When an obstacle is detected (YES at S101), collision prevention control is performed by the driving force being suppressed (S102). At this time, at the start of detection of the obstacle, the initial driving force is set for suppression of the driving force. The initial driving force is a driving force by which the vehicle 10 travels slowly. As a result of the driving force being set to the initial driving force that is a value smaller than a value based on an accelerator request by the driver, the vehicle 10 suddenly approaching the obstacle can be suppressed. When the required driving force based on the accelerator operation by the driver is greater than the initial driving force, the driving force is set to the initial driving force. Then, various signals indicating the state of the vehicle 10 are acquired (S103).

Next, whether or not the driving force has increased from the initial driving force is determined (S104). When the driving force has not been increased from the initial driving force (NO at S104), whether or not the vehicle 10 is in a start restriction state is determined to determine whether or not a process for increasing the driving force is required (S105). The start restriction state is a state in which the vehicle 10 is unable to start even though the vehicle 10 should start. In the determination process at step S105, an affirmative determination is made when all of conditions (a) to (d), below, are met.

(a) The accelerator sensor 32 detects the accelerator operation by the driver while the vehicle 10 is in a stopped state;

(b) the driving force is suppressed by the collision prevention control;

(c) operation of the brakes by the collision prevention control is not performed; and (d) the brake sensor 33 does not detect a brake operation by the driver.

When the condition (a), above, is not met, even when the vehicle 10 is stopped, the accelerator operation by the driver is not performed and the driver does not indicate an intention to traverse the bump 61. Therefore, control to correct the driving force for traversal of the bump 61 is not required. When the condition (b), above, is not met, the required driving force based on the accelerator operation by the driver is insufficient for traversing the bump 61. That is, it can be said that the driver does not indicate an intention to traverse the bump 61. In addition, should the driving force be corrected and increased, the driving force after correction will exceeds the required driving force. Therefore, the control to correct the driving force is not required to be performed. When the condition (c), above, is not met, the distance L between the vehicle 10 and the wall 50 is less than the stop distance. Therefore, the vehicle 10 is required to be maintained in the stopped state. Therefore, the control to correct the driving force is not performed. When the condition (d), above, is not met, it can be said that the driver indicates an intention to stop the vehicle 10. Therefore, the control to correct the driving force is not required to be performed.

When the above-described conditions are met, it can be said that the state is such that the bump 61 cannot be traversed as a result of the driving force being suppressed by the collision prevention control, regardless of the driver having an intention to traverse the bump 61. Therefore, when the above-described conditions are met, the vehicle 10 is determined to be in the start restriction state (YES at S105). A first process that is a process for increasing the driving force is performed (S106). When one or more conditions among the above-described conditions is not met, the state is not such that start is restricted by suppression of the driving force (NO at S105). Therefore, the series of processes is immediately ended.

In a control cycle that follows the control cycle in which the first process is performed, the driving force is in an increasing-correction state. Therefore, an affirmative determination is made at S104. Then, whether or not the value of the jerk is greater than the first predetermined value is determined (S107). When the value of the jerk is not a value greater than the first predetermined value (NO at S107), the first process is continued (S106) and the series of processes is ended. Meanwhile, when the value of the jerk is greater than the first predetermined value (YES at S107), whether or not the value of the jerk is greater than the second predetermined value is determined. When the value of the jerk is not a value greater than the second predetermined value (NO at S108), a second process in which the amount of increase in the driving force per time is less than that in the first process is performed (S109). The series of processes is ended. In the second process, the amount of increase in the driving force per time decreases as the value of the jerk increases.

When the second process is repeated and the jerk becomes greater than the second predetermined threshold, the driving force is set to the initial driving force (S110). The series of processes is ended. Here, when the first process is performed, the jerk may become greater than the second predetermined value. In this case, affirmative determinations are made at both S107 and S108. The process for setting the driving force to the initial driving force is performed without the transition from the first process to the second process.

According to the present embodiment, a process in which the driving force is increased in steps is used. That is, in each of the first process and the second process, after a fixed amount of time elapses from the increase in the driving force, a process to further add driving force is performed. At this time, when the jerk becomes greater than the first predetermined value, the process for increasing the driving force in the second process may be performed without the wait for the elapse of the fixed amount of time. In addition, when the jerk becomes greater than the second predetermined value, the process to set the driving force to the initial driving force may be performed without the wait for the elapse of the fixed amount of time. Furthermore, the first process and the second process are both processes for increasing the driving force. Therefore, the first process and the second process can also be considered increase processes.

Figure 4:
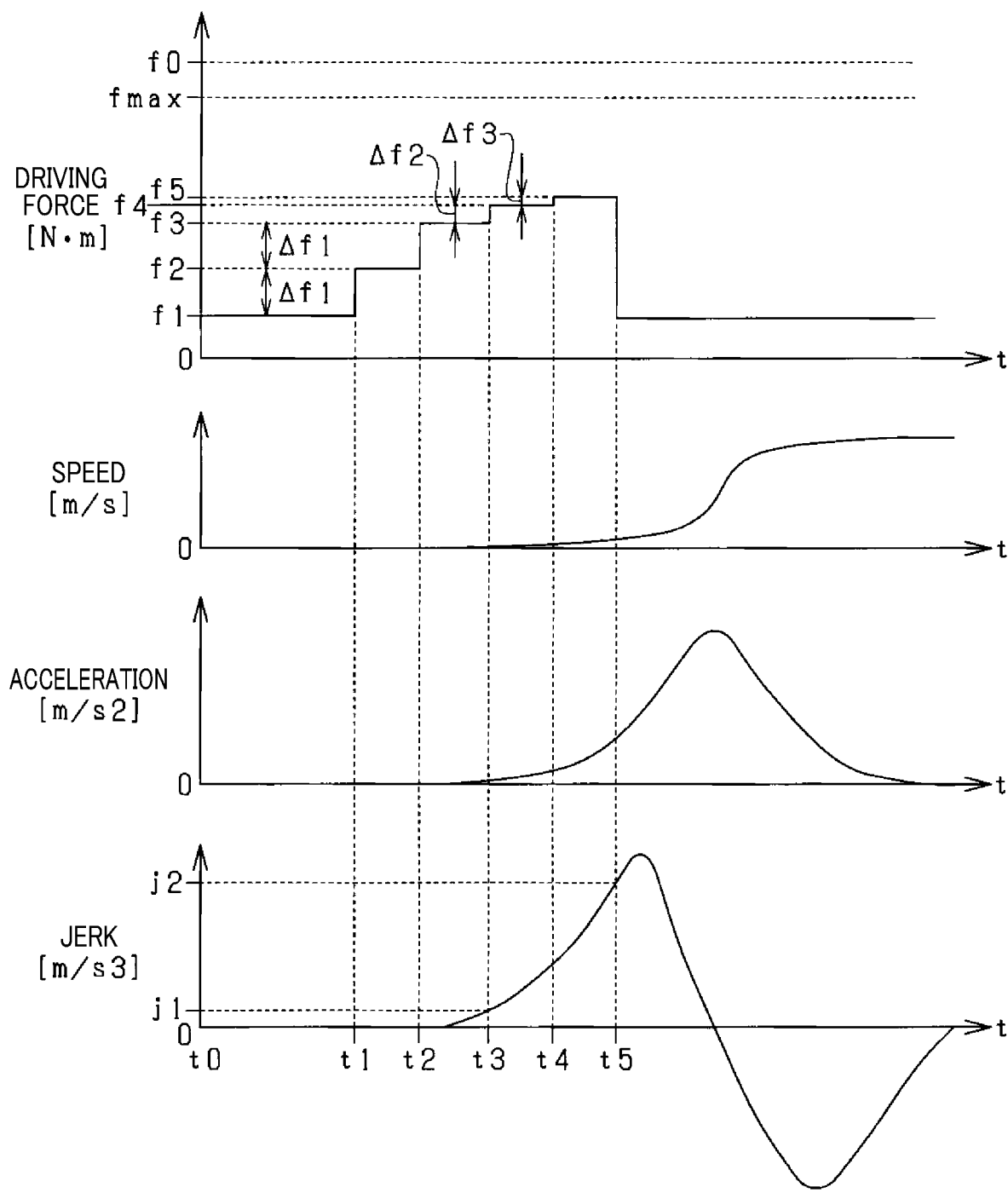
FIG. 4 is a time chart of when the vehicle traverses the bump according to the first embodiment.

FIG. 4 is a time chart of when the series of processes shown in FIG. 3 is repeatedly performed. In FIG. 4, the driving force commanded by the vehicle control apparatus, the speed detected by the wheel speed sensor 31, the acceleration detected by the acceleration sensor 34, and the jerk that is the time-derivative value of the acceleration are shown. In FIG. 4, the value of the speed is such that the speed in the direction in which the vehicle 10 traverses the bump 61 is a positive value. That is, when the vehicle 10 traverses the bump 61 by traveling in reverse, the speed in the reverse direction is a positive value.

In FIG. 4, at time t0, the required driving force is detected as f0, and the control to suppress the driving force is performed. A period from time t1 at which the driving force is increased from f1 that is the initial driving force to f2, to a time point before time t3 that is a time at which the driving force is increased from f3 to f4, is a period over which the first process is performed. In addition, a period from time t3 to a time point before time t5 that is a time at which the driving force is decreased from f5 to f1 that is the initial driving force is a period over which the second process is performed.

At time t1 at which the accelerator sensor 32 has detected the required driving force as f0 based on the acceleration operation by the driver and the state in which the speed is 0 has continued for a predetermined amount of time, control to increase the driving force from f1 that is the initial driving force to f2 is performed. When the driving force is increased to f2, the jerk is equal to or less than j1 that is the first predetermined value. Therefore, at time t2 at which a predetermined amount of time has elapsed from time t1, the driving force is increased to f3. At this time, the amount of increase in the driving force when the driving force is increased from f1 to f2 and the amount of increase in the driving force when the driving force is increased from f2 to f3 are both Δf1 and are equal values.

At subsequent time t3, the jerk exceeds j1 that is the first predetermined value. Therefore, with the amount of increase in the driving force set to Δf2 that is a value smaller than Δf1, the driving force is raised to f4. At this time, Δf2 is a value that can be acquired from the value of the jerk.

Furthermore, at time t4, the jerk has not exceeded j2 that is the second predetermined value. Therefore, the amount of increase in the driving force is set to Δf3 that is a value smaller than Δf2, and the driving force is raised to f5. At this time, when the driving force reaches fmax that is an upper limit value, the driving force is set to fmax.

At time t5, when the jerk exceeds j2 that is the second predetermined value, the process to return the driving force to f1 that is the initial driving force is performed. At this time, traversal of the bump 61 is completed. Therefore, the speed takes on a fixed value corresponding to the driving force. Although not shown in the drawing, when the distance between the vehicle 10 and the obstacle becomes the stop distance, a process to set the driving force to zero independent from the accelerator operation by the driver is performed. In addition, braking control is performed when the brake operation by the driver is not performed.

As a result of the above-described configuration, the vehicle control apparatus according to the present embodiment achieves the following effects.

The amount of increase per time in the driving force is small when the vehicle 10 starts to move. As a result, traversal of the bump 61 is made possible while suppressing the vehicle speed from becoming excessive. In addition, when the vehicle 10 starts to move, gradual increase in the driving force is performed rather than the gradual increase in the driving force being immediately ended or the driving force being returned to the initial value. Therefore, the amount of time required for traversal of the bump 61 and the like can be shortened.

The amount of increase per time in the driving force is changed based on the value of the jerk. Therefore, the driving force at the time traversal of the bump 61 by the vehicle 10 is completed can be further suppressed from becoming excessive.

When movement of the vehicle 10 is determined based on acceleration, effects of offset on a sloped road may occur. In addition, when movement of the vehicle 10 is determined based on speed, determination of the start of movement of the vehicle 10 is difficult at a very low speed. In this regard, because the start of movement of the vehicle 10 is determined based on the jerk, the start of movement of the vehicle 10 can be detected with more accuracy.

Second Embodiment

According to a present embodiment, the process when the jerk exceeds the second predetermined value differs from that according to the first embodiment. Specifically, a process to gradually reduce the driving force is performed when the jerk exceeds the second predetermined value.

Figure 5:
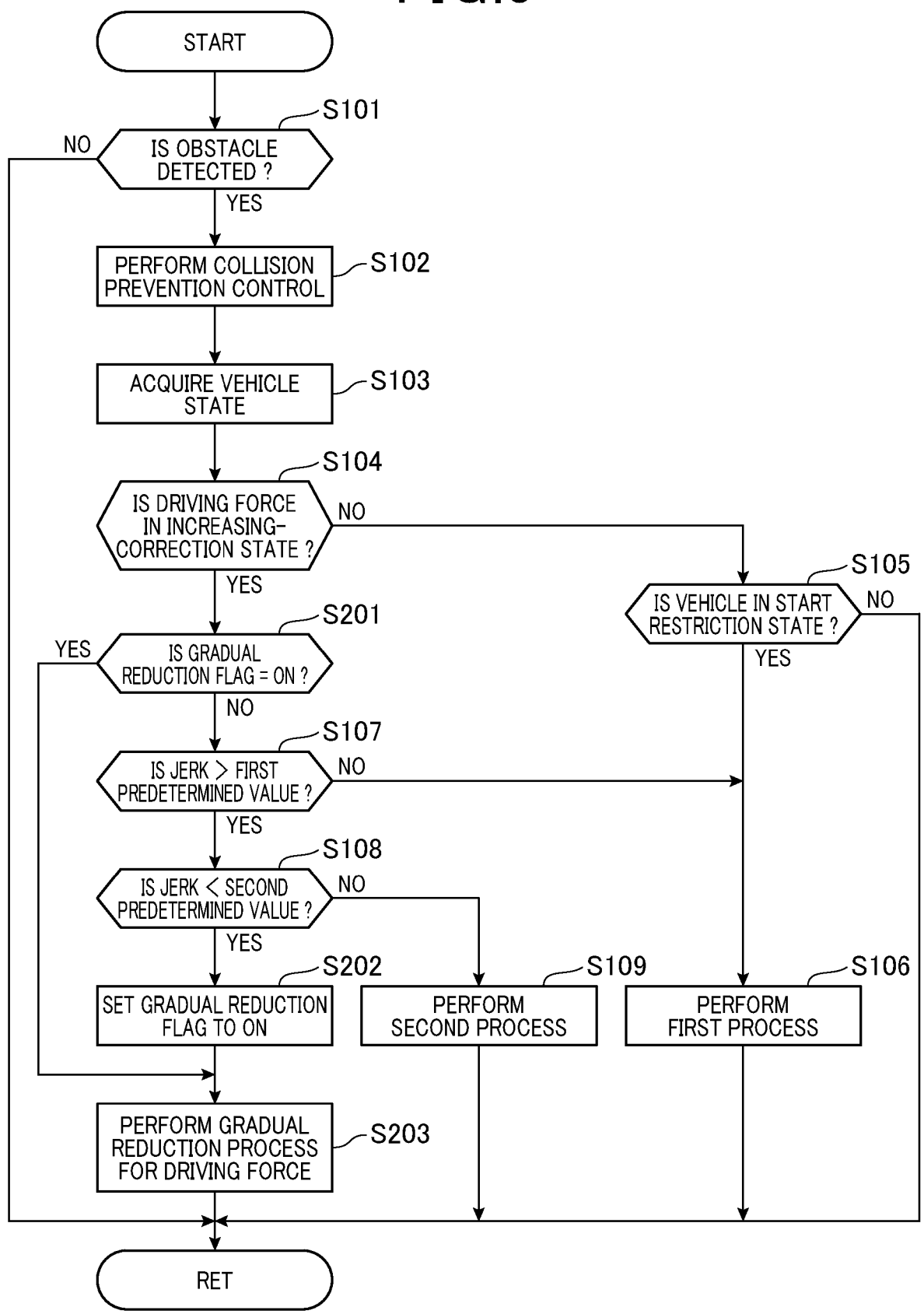
FIG. 5 is a flowchart showing processes according to a second embodiment.

FIG. 5 is a flowchart showing a series of controls when the process according to the present embodiment is performed. In the flowchart in FIG. 5, processes equivalent to those according to the first embodiment are given the same reference numbers. Descriptions thereof are omitted.

First, in a manner similar to that according to the first embodiment, processes up to that at S104 are performed. When the driving force is determined to be in the increasing-correction state at step S104, whether or not the process to gradually reduce the driving force is performed is determined (S201). At S201, the determination is made based on a flag that indicates that the process for gradually reducing the driving force has been started. When the process to gradually reduce the driving force is not performed (NO at S201), in a manner similar to that according to the first embodiment, whether or not the jerk exceeds the first predetermined value and the second predetermined value is determined (S107 and S108). When the jerk exceeds the second predetermined value (YES at S108), the flag that indicates that the process for gradually reducing the driving force has been started is set to ON (S202). Then, the gradual reduction process for the driving force is performed (S203). The series of processes is ended.

Meanwhile, when the process to gradually reduce the driving force is already started (YES at S201), the gradual reduction process for the driving force is performed (S203). The series of processes is ended. Regarding the flag that indicates that the process for gradually reducing the driving force has been started, the flag may be reset when the driving force is set to the initial driving force as a result of the gradual reduction process for the driving flag being performed.

Figure 6:
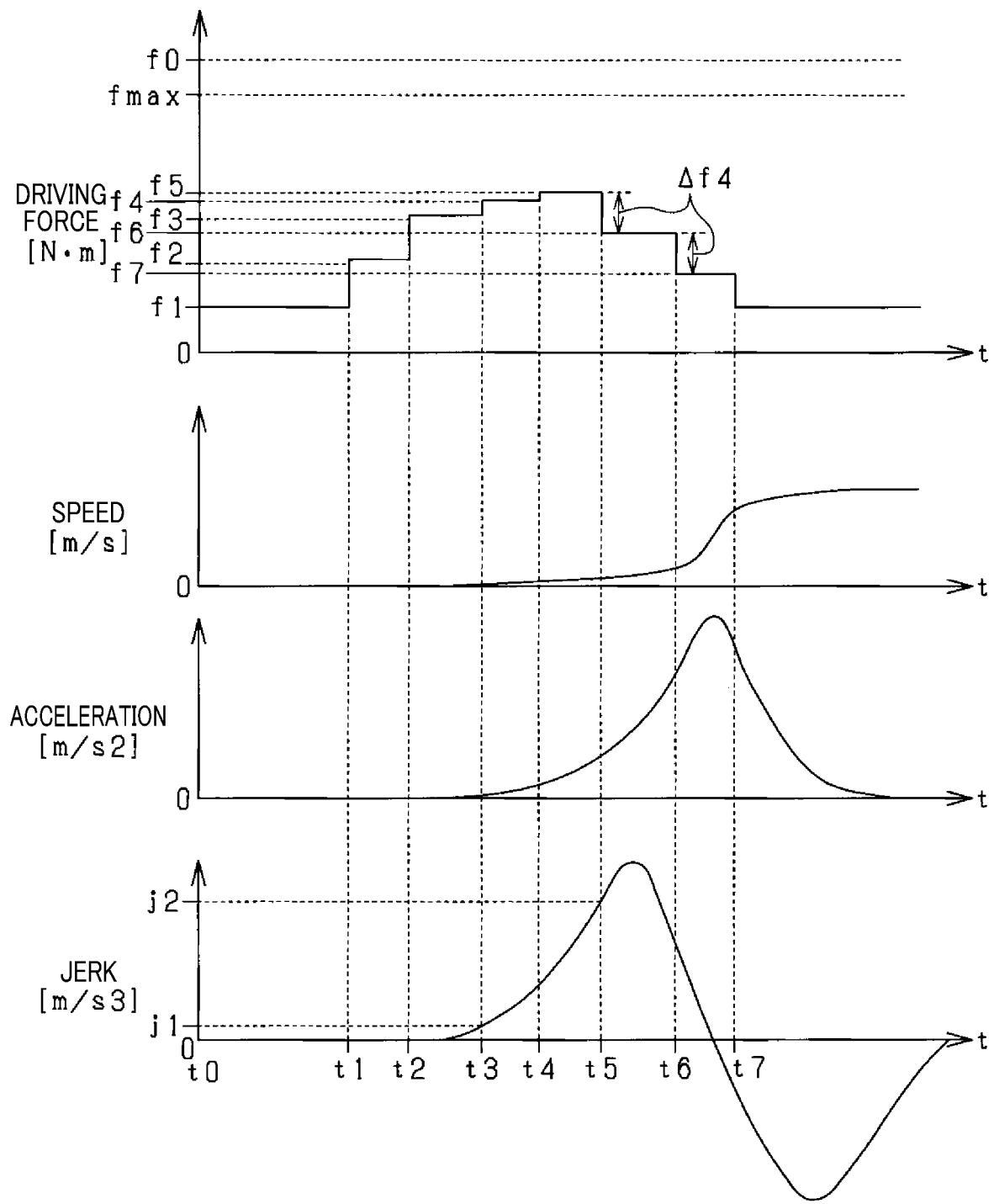
FIG. 6 is a time chart of when a vehicle traverses a bump according to the second embodiment.

FIG. 6 is a time chart when the series of processes shown in FIG. 5 is repeatedly performed. The time chart before time t5 at which the vehicle 10 is in the start restriction state and the process for increasing the driving force is continued is equivalent to that according to the first embodiment. Therefore, description thereof is omitted. At time t5, when the jerk exceeds the second predetermined value, the process to gradually reduce the driving force is started.

At time t5, an amount of decrease in the driving force is set to Δf4. The amount of decrease in the driving force is Δf4 at subsequent time t6, as well. Then, at time t7, an amount of deviation between the driving force at this time and the initial driving force is less than Δf4. Therefore, the driving force is set to the initial driving force. The amount of decrease in the driving force is not required to be fixed. For example, the amount of decrease may increase as the driving force increases.

As a result of the above-described configuration, the vehicle control apparatus according to the present embodiment achieves the following effects in addition to the effects achieved by the vehicle control apparatus according to the first embodiment.

When the driving force exceeds the second predetermined value, the vehicle 10 may stop in a state in which the vehicle 10 is in the middle of traversing the bump 61, when the driving force is immediately set to the initial driving force. According to the present embodiment, the driving force is gradually decreased. Therefore, a situation in which the vehicle 10 stops in a state in which the vehicle 10 is in the midst of traversing the bump 61 can be suppressed.

Variation Examples

According to each embodiment, an example in which the vehicle 10 enters the start restriction state as a result of the bump 61 is given. However, the vehicle 10 similarly enters the start restriction state on a sloped road as well. That is, the vehicle 10 cannot start from the stopped state by the initial driving force when a running resistance is present, such as when the bump 61 is present or the road is a sloped road. Therefore, the processes according to the above-described embodiments can be similarly applied.

Figure 7:
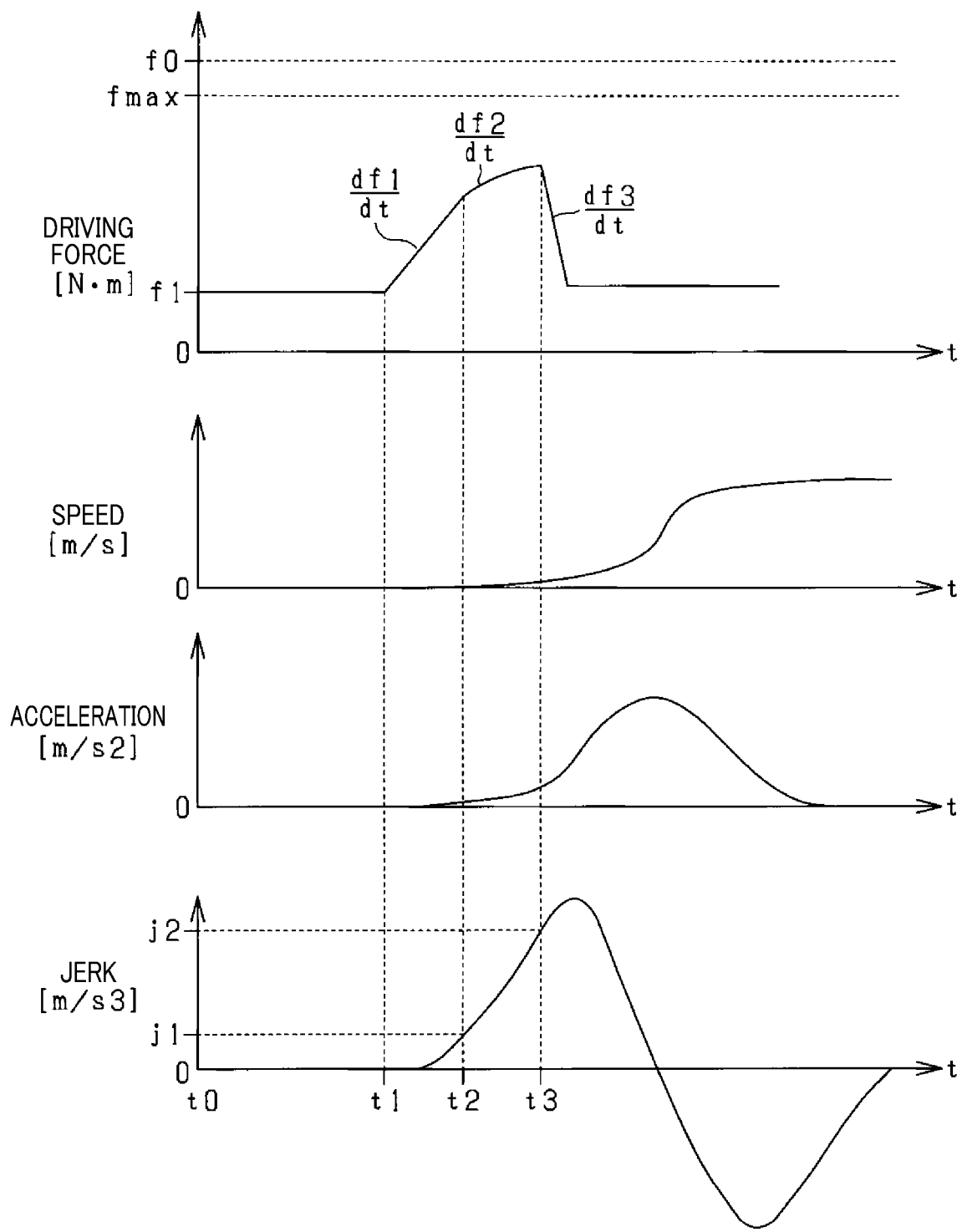
FIG. 7 is a time chart of when processes for continuously increasing driving force are performed.

According to each embodiment, the driving force is increased in steps at every predetermined cycle. However, as shown in FIG. 7, increase/decrease may be performed each time the process is performed. At this time, when the jerk is equal to or less than the first predetermined value, the amount of increase per time in the driving force is set to df1/dt. When the jerk is greater than the first predetermined value and equal to or less than the second predetermined value, the amount of increase per time in the driving force is set to df2/dt that is a value smaller than df1/dt. The value df2/dt is a value that becomes smaller as the jerk increases. Then, when the jerk exceeds the second predetermined value, the amount of decrease per time in the driving force is set to df3/dt (<0). As according to the first embodiment, control to set to the driving force to the initial driving force may be performed when the jerk exceeds the second predetermined value.

According to the first embodiment, as according to the second embodiment, a flag that indicates that the jerk has exceeded the first predetermined value may be set when the jerk exceeds the first predetermined value. At the next control and subsequent controls, the process at S108 and subsequent processes may be performed without the process at S107 being performed. This similarly applies when the jerk exceeds the second predetermined value.

According to each embodiment, the amount of increase in the driving force when the driving force exceeds the first predetermined value is determined based on the value of the jerk. However, the amounts of increase in the driving force may be equal. As a result, simplification of the control becomes possible.

According to each embodiment, whether or not movement of the vehicle 10 has started is determined based on the value of the jerk. However, whether or not movement of the vehicle 10 has started may be determined based on the value of the speed or acceleration. When the value of the acceleration is used for the determination, a value in a state in which the vehicle 10 is stopped may be an offset, and whether or not an amount of change from this value exceeds a threshold may be determined.

According to each embodiment, whether or not movement of the vehicle 10 has started is determined based on the value of the jerk. However, whether or not movement of the vehicle 10 has started may be determined using two or more values among the speed, acceleration and jerk. For example, when the bump 61 is traversed without the value of the jerk exceeding a threshold, the value of the speed is based on the value of the driving force. In this case, movement of the vehicle 10 can be detected by the wheel speed sensor 31. Therefore, a process to determine traversal of the bump 61 based on the speed may be added.

According to the above-described embodiments, whether or not the vehicle 10 is in the start restriction state is based on all of the conditions (a) to (d) being met. However, regarding whether or not the vehicle 10 is in the start restriction state, the vehicle 10 may be determined to be in the start restriction state when at least the conditions (a) and (b) are met.

According to the above-described embodiments, the start restriction state is determined based on the detection value of the accelerator sensor 32. However, control that is applied to the vehicle 10 that performs automatic driving based on a command from a high-order ECU, and in which the driving force is increased in a state in which the driving force based on the command is suppressed based on the distance to the wall 50 and the vehicle 10 is in the start restriction state may be performed.

According to the above-described embodiments, the value of the jerk is acquired by time differentiation being performed on the acceleration detected by the acceleration sensor 34. However, a jerk sensor that directly detects the value of the jerk may be used.

According to the above-described embodiment, torque is given as an example of the driving force. However, output may be controlled. In addition, a rotation frequency of the engine 41 may be controlled.

According to the above-described embodiment, a drive source of the vehicle 10 is the engine 41. However, the vehicle 10 may be driven by a motor and control of the driving force of the motor may be performed.

According to the above-described embodiments, in the vehicle control ECU 20 that is the vehicle control apparatus, a program is stored in the ROM that corresponds to a non-transitory tangible storage medium. The functions of the vehicle control apparatus are actualized as a result of the CPU that corresponds to a processor of a computer running the program. However, a configuration in which the program is stored in a non-transitory tangible recording medium other than the ROM (such as a non-volatile memory other than the ROM) and a processor such as the CPU runs the program is also possible. In this case, a configuration in which, as a result of the processor running the program stored in the non-transitory tangible recording medium, a method (such as a vehicle control method) corresponding to the program is performed in the vehicle control apparatus is also possible.

In addition, some or all of the functions provided by the vehicle control apparatus may be configured as hardware by a single or a plurality of integrated circuits (that is, ICs), or the like. Furthermore, each unit (such as the object detecting unit 21, the state acquiring unit 22, and the suppressing unit 23) of the vehicle control ECU 20 provided by the vehicle control apparatus may be provided by software recorded in a non-transitory tangible recording medium, such as a non-volatile memory, and a computer that runs the software, by the software alone, by hardware alone, or by a combination thereof.

While the present disclosure has been described with reference to embodiments thereof, it is to be understood that the disclosure is not limited to the embodiments and constructions. The present disclosure is intended to cover various modification examples and modifications within the range of equivalency. In addition, various combinations and configurations, and further, other combinations and configurations including more, less, or only a single element thereof are also within the spirit and scope of the present disclosure.

The invention claimed is:
1. A vehicle control apparatus comprising:
a processor configured to:
detect an object in a travelling direction of a vehicle;
perform a suppression process to suppress a driving force of the vehicle in response to detection of the object in the travelling direction of the vehicle;
perform, during a state in which the driving force of the vehicle is suppressed due to the suppression process, a first increase process to gradually increase the driving force from an initial driving force with a first amount of increase per time, in response to:
(1) a command to move the vehicle in the travelling direction;
(2) the vehicle being in a start restriction state in which the vehicle cannot start by the initial driving force due to a running resistance being present between the vehicle and the object; and
(3) the vehicle being in a stopped state and not starting to move from the stopped state;
perform, in response to the vehicle starting to move from the stopped state, a second increase process to change the first amount of increase per time to a second amount of increase per time that is less than the first amount of increase per time and to gradually increase the driving force with the second amount of increase per time; and acquire at least one of a value of a speed of the vehicle in the travelling direction, a value of an acceleration of the vehicle in the travelling direction, and a value of a jerk of the vehicle in the travelling direction, as a determination value, wherein the processor performs the second increase process in response to determining, using the determination value, that movement of the vehicle has started following the stopped state, and in the second increase process, the processer reduces the second amount of increase per time as the determination value increases.

2. The vehicle control apparatus according to claim 1, wherein:

the processor performs the first increase process to gradually increase the driving force in response to the determination value being less than a first threshold; and the processor performs the second increase process to gradually increase the driving force in response to the determination value being less than a second threshold that is larger than the first threshold.

3. A vehicle control apparatus comprising:

a processor configured to:

detect an object in a travelling direction of a vehicle;

acquire at least one of a value of speed of the vehicle in the travelling direction, a value of acceleration of the vehicle in the travelling direction, and a value of jerk of the vehicle in the travelling direction as a determination value; and perform a suppression process to suppress a driving force of the vehicle in response to detection of the object, wherein the processor performs, during a state in which the driving force of the vehicle is suppressed due to the suppression process, a first increase process to gradually increase the driving force from an initial driving force with a first amount of increase per time, in response to:

(i) the vehicle being in a start restriction state in which the vehicle cannot start by the initial driving force due to a running resistance being present between the vehicle and the object;

(ii) the determination value being less than a threshold; and (iii) a command to move the vehicle in the travelling direction, the processor performs, in response to the vehicle starting to move from the start restriction state, a second increase process to change the first amount of increase per time to a second amount of increase per time that is less than the first amount of increase per time and to gradually increase the driving force with the second amount of increase per time, and in the second increase process, the processor reduces an amount of increase per time in the driving force as the determination value increases.

4. The vehicle control apparatus according to claim 3, wherein:

the processor performs a process to reduce the driving force in response to the determination value becoming greater than the threshold.

5. The vehicle control apparatus according to claim 4, wherein:

the processor performs another process to gradually reduce the driving force in response to the determination value becoming greater than the threshold.

6. The vehicle control apparatus according to claim 5, wherein:

the processor increases an amount of decrease per time in the driving force as the driving force increases in response to the determination value becoming greater than the threshold.

7. The vehicle control apparatus according to claim 6, wherein:

an acceleration sensor is provided in the vehicle; and the processor determines the jerk based on acceleration of the vehicle in the travelling direction detected by the acceleration sensor, and sets the jerk as the determination value.

8. A vehicle control method that is performed by a vehicle control apparatus mounted in a vehicle, the vehicle control method comprising:

detecting an object in a travelling direction of the vehicle;

acquiring at least one of a value of a speed of the vehicle in the travelling direction, a value of acceleration of the vehicle in the travelling direction, and a value of jerk of the vehicle in the travelling direction, as a determination value;

performing a suppression process to suppress a driving force of the vehicle in response to detection of the object in the traveling direction of the vehicle;

performing, during a state in which the driving force of the vehicle is suppressed due to the suppression process, a first increase process to gradually increase the driving force from an initial driving force with a first amount of increase per time, in response to:

(i) the vehicle being in a start restriction state in which the vehicle cannot start by the initial driving force due to a running resistance being present between the vehicle and the object;

(ii) the determination value being less than a threshold value; and (iii) a command to move the vehicle in the travelling direction;

performing, in response to the vehicle starting to move from the start restriction state, a second increase process to change the first amount of increase per time to a second amount of increase per time that is less than the first amount of increase per time and to gradually increase the driving force with the second amount of increase per time; and in the second increase process, reducing an amount of increase per time in the driving force as the determination value increases.

9. The vehicle control apparatus according to claim 2, wherein:

the processor reduces the driving force in response to the determination value becoming greater than the first threshold.

10. The vehicle control apparatus according to claim 1, wherein:

an acceleration sensor is provided in the vehicle; and the processor determines the jerk based on the acceleration of the vehicle in the travelling direction detected by the acceleration sensor, and sets the jerk as the determination value.

11. A vehicle control apparatus comprising:

a processor, wherein the processor is configured to:

detect an object in a travelling direction of a vehicle; and perform a suppression process to suppress a driving force of the vehicle in response to detection of the object in the traveling direction of the vehicle, wherein the processor performs, during a state in which the driving force of the vehicle is suppressed by the suppression process, a first increase process to gradually increase the driving force from an initial driving force with a first amount of increase per time, in response to:
(1) a command to move the vehicle in the travelling direction; and
(2) the vehicle being in a start restriction state in which the vehicle cannot start by the initial driving force due to a running resistance being present between the vehicle and the object; and
(3) the vehicle being in a stopped state and not starting to move from the stopped state, and performs, in response to the vehicle starting to move from the stopped state, a second increase process to change the first amount of increase per time to a second amount of increase per time that is less than the first amount of increase per time and to gradually increase the driving force with a second amount of increase per time, the processor acquires at least one of a value of a speed of the vehicle in the travelling direction, a value of an acceleration of the vehicle in the travelling direction, and a value of a jerk of the vehicle in the travelling direction, as a determination value, the processor performs the second increase process in response to determining, using the determination value, that movement of the vehicle has started, an acceleration sensor is provided in the vehicle, and the processor determines the jerk based on the acceleration of the vehicle in the travelling direction detected by the acceleration sensor, and sets the jerk as the determination value.

12. The vehicle control apparatus according to claim 11, wherein:

the processor performs the second increase process to gradually increase the driving force in response to the determination value being less than a threshold.

13. The vehicle control apparatus according to claim 12, wherein:

the processor reduces the driving force in response to the determination value becoming greater than the threshold.

\* \* \* \* \*